US012622421B2

(12) United States Patent
Kawai et al.

(10) Patent No.: US 12,622,421 B2
(45) Date of Patent: May 12, 2026

(54) FISHING LINE GUIDE AND FISHING ROD EQUIPPED WITH SAID FISHING LINE GUIDE

(71) Applicant: GLOBERIDE, Inc., Tokyo (JP)

(72) Inventors: Kazuki Kawai, Tokyo (JP); Masayuki Watanabe, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 18/283,171

(22) PCT Filed: Oct. 26, 2021

(86) PCT No.: PCT/JP2021/039423
§ 371 (c)(1),
(2) Date: Sep. 20, 2023

(87) PCT Pub. No.: WO2022/208960
PCT Pub. Date: Oct. 6, 2022

(65) Prior Publication Data
US 2024/0306622 A1     Sep. 19, 2024

(30) Foreign Application Priority Data

Mar. 30, 2021     (JP) ................................. 2021-057583

(51) Int. Cl.
*A01K 87/04*          (2006.01)
*A01K 87/02*          (2006.01)
(52) U.S. Cl.
CPC .............. *A01K 87/04* (2013.01); *A01K 87/02* (2013.01)
(58) Field of Classification Search
CPC ......... A01K 87/04; A01K 87/02; A01K 87/00
(Continued)

(56) References Cited

U.S. PATENT DOCUMENTS 3,171,228 A * 3/1965 Cwik ..................... A01K 87/04
43/24
3,760,524 A * 9/1973 Butler, Jr. .............. A01K 87/04
156/215
(Continued)

FOREIGN PATENT DOCUMENTS

JP          2006340661 A      12/2006
JP          2016119887 A       7/2016
(Continued)

OTHER PUBLICATIONS

International Search Report for related International Application No. PCT/JP2021/039423; action dated Oct. 6, 2022; (2 pages).
(Continued)

*Primary Examiner* — William L Gmoser
(74) *Attorney, Agent, or Firm* — OLIFF PLC.

(57)                    ABSTRACT

Provided is a fishing line guide capable of not only reducing the weight while securing the rigidity and strength of the entire guide but also reducing the occurrence of line twisting and line tangling during actual fishing, and a fishing rod comprising the fishing line guide. A fishing line guide according to an embodiment of the present disclosure comprises: a fishing line guiding portion formed with a through-hole for guiding a fishing line; a fishing rod fixing portion to be fixed to a fishing rod; and a connection portion connecting the fishing line guiding portion and the fishing rod fixing portion, and the fishing line guide is integrally formed of a ceramic material.

9 Claims, 5 Drawing Sheets

(58) Field of Classification Search
USPC ................................................ 43/24, 18.1 R
See application file for complete search history.

(56) References Cited

U.S. PATENT DOCUMENTS

| | | | | |
|---|---|---|---|---|
| 4,682,439 A * | 7/1987 | Inoue | ..................... | A01K 87/04 |
| | | | | 43/24 |
| 5,347,743 A * | 9/1994 | Tokuda | .................. | A01K 87/04 |
| | | | | 43/24 |
| 5,901,492 A * | 5/1999 | Ohmura | ................. | A01K 87/04 |
| | | | | 43/24 |
| 5,941,013 A * | 8/1999 | Ohmura | ................. | A01K 87/04 |
| | | | | D22/143 |
| 6,067,742 A * | 5/2000 | Ohmura | ................. | A01K 87/04 |
| | | | | 43/24 |
| 6,067,743 A * | 5/2000 | Ohmura | ................. | A01K 87/04 |
| | | | | D22/143 |
| 7,225,581 B1 * | 6/2007 | Kirk | ....................... | A01K 87/04 |
| | | | | 43/24 |
| 9,609,854 B2 * | 4/2017 | Akiba | .................... | A01K 87/04 |
| 12,048,298 B2 * | 7/2024 | Penicka | ................. | A01K 87/02 |
| 2006/0283073 A1 | 12/2006 | Omura | | |
| 2016/0183506 A1 * | 6/2016 | Omura | .................. | A01K 87/04 |
| | | | | 43/24 |
| 2016/0286772 A1 | 10/2016 | Gnann et al. | | |
| 2018/0343841 A1 | 12/2018 | Mikaki | | |
| 2019/0008129 A1 | 1/2019 | Akiba et al. | | |
| 2022/0394965 A1 * | 12/2022 | Kaminou | ............... | A01K 87/04 |

FOREIGN PATENT DOCUMENTS

| | | |
|---|---|---|
| JP | 6826934 B2 | 2/2021 |
| KR | 20000011183 A | 2/2000 |
| KR | 20-0174193 Y1 | 3/2000 |
| WO | 2017090717 A1 | 6/2017 |
| WO | 2017149832 A1 | 9/2017 |

OTHER PUBLICATIONS

Written Opinion for related International Application No. PCT/JP2021/039423; action dated Oct. 6, 2022; (3 pages).
Jun. 27, 2024 Office Action issued in Australian Patent Application No. 2021438460.
May 29, 2025 Office Action issued in United Kingdom Patent Application No. 2312450.6.
Aug. 29, 2025 Office Action issed in UK Patent Application No. 2312450.6.
Oct. 22, 2025 Office Action issued in Singaporean Patent Application No. 11202306856Q.
Jan. 19, 2026 Office Action issued in Chinese Patent Application No. 202180095949.2.
Aug. 28, 2025 Office Action issued in Korean Patent Application No. 10-2023-7036710.
Mar. 2, 2026 Office Action issued in UK Patent Application No. GB2312450.6.

* cited by examiner

FISHING LINE GUIDE AND FISHING ROD EQUIPPED WITH SAID FISHING LINE GUIDE

CROSS-REFERENCE TO RELATED APPLICATIONS

The present application is a National Stage of International Application No. PCT/JP2021/039423, filed on Oct. 26, 2021 which claims priority to and the benefit of Japanese Patent Application No. 2021-057583, filed on Mar. 30, 2021, the contents of which are incorporated herein by reference in their entirety.

FIELD

The present disclosure relates to a fishing line guide and a fishing rod comprising the fishing line guide.

BACKGROUND ART

Conventionally, various fishing line guides to be attached to a fishing rod and guide a fishing line are known. Such a fishing line guide includes a frame to be attached to an outer peripheral surface of a fishing rod or a frame having an end into which a rod body is inserted, and a guide ring that is fixedly attached to the frame and through which a fishing line is threaded.

As such a fishing line guide, Patent Literature 1 discloses a fishing line guide having a metal-formed frame in which a ring holding portion for holding a guide ring through which a fishing line is threaded and a fixing portion for being attached to an outer surface of a fishing rod are integrally formed.

Further, Patent Literature 2 discloses a fishing line guide to be attached to an outer side of a rod body, including a guide ring for guiding a fishing line and a metal guide frame for holding the guide ring, in which the guide frame includes an attachment portion for being attached to the rod body and a frame main body portion rising from the attachment portion and formed with a ring attachment hole to which the guide ring is attached, the guide frame is integrally formed by forging, and a thick portion thicker than the attachment portion is provided at a boundary portion between the frame main body portion and the attachment portion.

CITATION LIST

Patent Literature

Patent Literature 1: JP 2006-340661 A
Patent Literature 2: JP 2016-119887 A

SUMMARY

However, the fishing line guide disclosed in Patent Literature 1 includes a ring portion and a metal frame portion and, depending on a releasing direction of the line, the line may come into contact with the metal portion, which has a large friction coefficient, causing an issue of the occurrence of line tangling and line twisting. In addition, since it is formed of two components of the ring portion and the frame portion, there is also an issue of increased weight and size.

In the fishing line guide disclosed in Patent Literature 2, the guide frame is integrally formed by forging and a joint portion such as a brazed portion does not exist, which prevents the occurrence of corrosion, line tangling, and line twisting at the joint portion. In addition, since the guide frame is formed by forging, sufficient strength can be secured even with the reduced thickness and the thickness can be changed, so that it is possible to secure the strength of the guide frame as a whole while reducing its weight. However, the fishing line guide includes a ring portion and a metal frame portion and, depending on a releasing direction of the line, the line may come into contact with the metal portion, which has a large friction coefficient, causing an issue of the occurrence of line twisting. In addition, since the guide frame is made of metal even with the reduced thickness and the fishing line guide is formed of two components of the ring portion and the frame portion, there is also an issue of inevitably increased weight and size.

In view of the above issues, an object of embodiments of the present disclosure is to provide a fishing line guide capable of not only reducing the weight while securing the rigidity and strength of the entire guide but also reducing the occurrence of line twisting and line tangling during actual fishing, and to provide a fishing rod comprising the fishing line guide.

Other objects of embodiments of the present disclosure will become apparent by reference to the entire specification.

A fishing line guide according to an embodiment of the present disclosure comprises: a fishing line guiding portion formed with a through-hole for guiding a fishing line; a fishing rod fixing portion to be fixed to a fishing rod; and a connection portion connecting the fishing line guiding portion and the fishing rod fixing portion, and the fishing line guide is integrally formed of a ceramic material.

The fishing line guide according to an embodiment of the present disclosure is formed in a concave shape as viewed from a direction perpendicular to an axis of the through-hole, and an outer contour on an inner surface side of the fishing line guiding portion and the connection portion is curved in an arc shape.

The fishing line guide according to an embodiment of the present disclosure is formed in a concave shape as viewed from a direction perpendicular to an axis of the through-hole, and an outer contour on an inner surface side of the fishing line guiding portion and the connection portion has no straight portion.

In the fishing line guide according to an embodiment of the present disclosure, a thickness of the fishing line guiding portion increases toward the connection portion as viewed along a direction of an axis of the through-hole.

In the fishing line guide according to an embodiment of the present disclosure, a thickness of the connection portion increases toward the fishing rod fixing portion as viewed along a direction of an axis of the through-hole.

The fishing line guide according to an embodiment of the present disclosure is formed in a concave shape as viewed from a direction perpendicular to an axis of the through-hole, an outer contour on an inner surface side of the fishing line guiding portion and the connection portion comprises a plurality of arc portions, and the arc portions are connected by one or more inflection points.

In the fishing line guide according to an embodiment of the present disclosure, the fishing line guiding portion is inclined by 10 to 45° with respect to the fishing rod fixing portion.

In the fishing line guide according to an embodiment of the present disclosure, an outer contour on an outer surface side of the fishing line guiding portion is curved in a convex shape as viewed from a direction perpendicular to an axis of the through-hole.

In the fishing line guide according to an embodiment of the present disclosure, a difference between an outer diameter and an inner diameter of the fishing line guiding portion is in a range of 1.2 mm to 2.0 mm.

In the fishing line guide according to an embodiment of the present disclosure, a ratio of an inner diameter of the fishing line guiding portion to an outer diameter of the fishing line guiding portion is 0.55 or more.

A fishing rod according to an embodiment of the present disclosure comprises: a rod tube; and a fishing line guide comprising a fishing line guiding portion formed with a through-hole for guiding a fishing line, a fishing rod fixing portion to be fixed to the rod tube, and a connection portion connecting the fishing line guiding portion and the fishing rod fixing portion, and the fishing line guide is integrally formed of a ceramic material.

According to various embodiments of the present disclosure, it is possible to provide a fishing line guide capable of not only reducing the weight while securing the rigidity and strength of the entire guide but also reducing the occurrence of line twisting and line tangling during actual fishing, and to provide a fishing rod comprising the fishing line guide.

DETAILED DESCRIPTION

Figure 1:
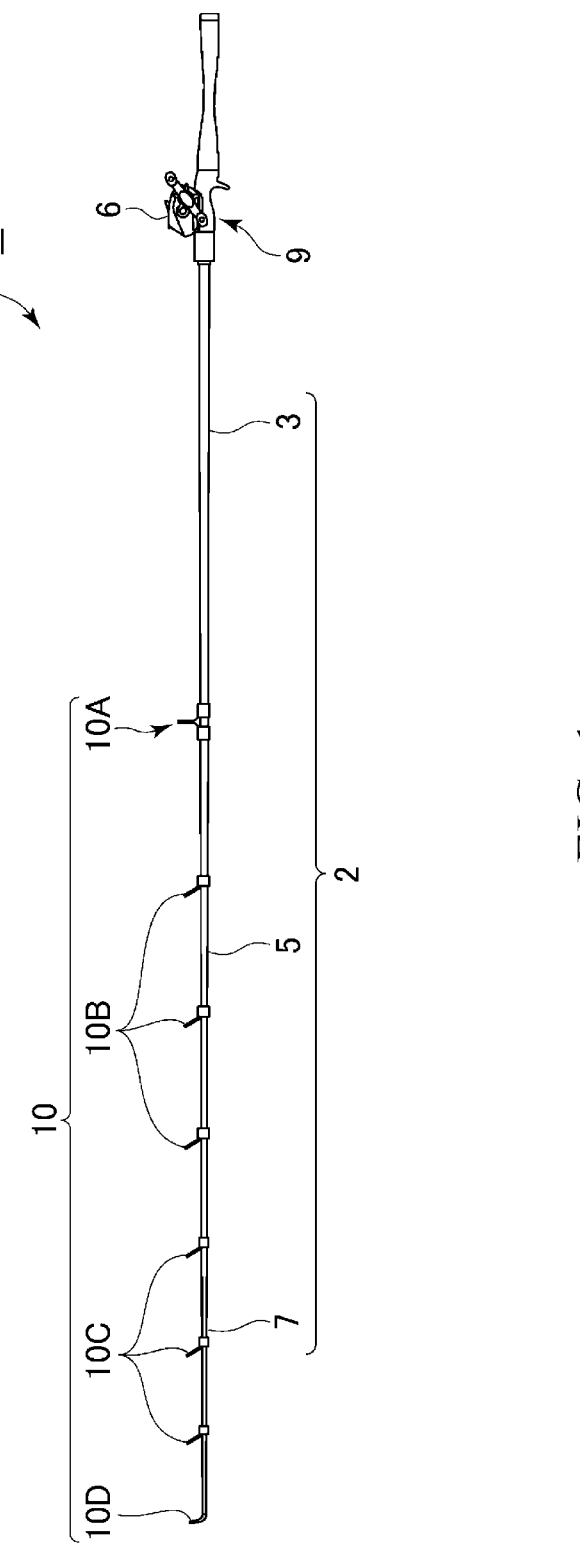
FIG. 1 is a view illustrating an aspect of a fishing rod 1 according to an embodiment of the present disclosure.

Various embodiments of the present disclosure will be described below with reference to the drawings as appropriate. Note that common components in the drawings are denoted by the same reference signs. The drawings are not always drawn to scale for convenience of description. Hereinafter, embodiments of the present disclosure will be described with reference to the drawings.

FIG. 1 is a view illustrating an embodiment of a fishing rod according to the present disclosure. As illustrated in the figure, a fishing rod 1 according to an embodiment of the present disclosure comprises a rod body 2, a reel 6 attached to the rod body 2 via a reel seat 9, and fishing line guides 10 (10D denotes a top guide) attached to the rod body 2. In the illustrated embodiment, the reel seat 9 and the fishing line guides 10 each correspond to an attachment component attached to an outer peripheral surface of the rod body.

The rod body 2 is configured by, for example, connecting a base rod 3, a middle rod 5, a tip rod 7, and the like to each other. These rod bodies are jointed to each other, for example, as an ordinarily jointed type. The base rod 3, the middle rod 5, and the tip rod 7 can be jointed to each other as a telescopic type, an inversely jointed type, a socket-and-spigot jointed type, or any other known joined type. The rod body 2 may be formed of a single rod body.

The base rod 3, the middle rod 5, and the tip rod 7 are each formed of, for example, a tubular body made of a fiber-reinforced resin. This tubular body made of a fiber-reinforced resin is formed by winding a fiber-reinforced resin prepreg sheet) (prepreg in which reinforcing fibers are impregnated with a matrix resin around a core metal, and heating and curing the prepreg sheet. As the reinforcing fibers contained in the prepreg sheet, for example, carbon fibers, glass fibers, and any other known reinforcing fibers can be used. As the matrix resin contained in the prepreg sheet, for example, a thermosetting resin such as an epoxy resin can be used. Examples of such a thermosetting resin include, but are not limited to, unsaturated polyesters, phenols, and vinyl esters. When a thermoplastic resin is used, examples thereof include, but are not limited to, polyether sulfone (PES), polyphenylene sulfide (PPS), polyether ether ketone (PEEK), polycarbonate (PC), and polyamides (PA: 6, 12, 66, etc.). After the prepreg sheet is cured, the core metal is removed. Furthermore, an outer surface of the tubular body is appropriately polished. Each of the rod bodies may be formed in a solid state.

In the illustrated embodiment, the base rod 3, the middle rod 5, and the tip rod 7 are provided with a plurality of fishing line guides 10 (fishing line guides 10A to 10D) for guiding a fishing line fed from the reel 6 attached to the reel seat 9. More specifically, the base rod 3 is provided with the fishing line guide 10A, the middle rod 5 is provided with the fishing line guides 10B, and the tip rod 7 is provided with the fishing line guides 10C. The top guide 10D is provided at the tip of the tip rod 7.

Figure 2:
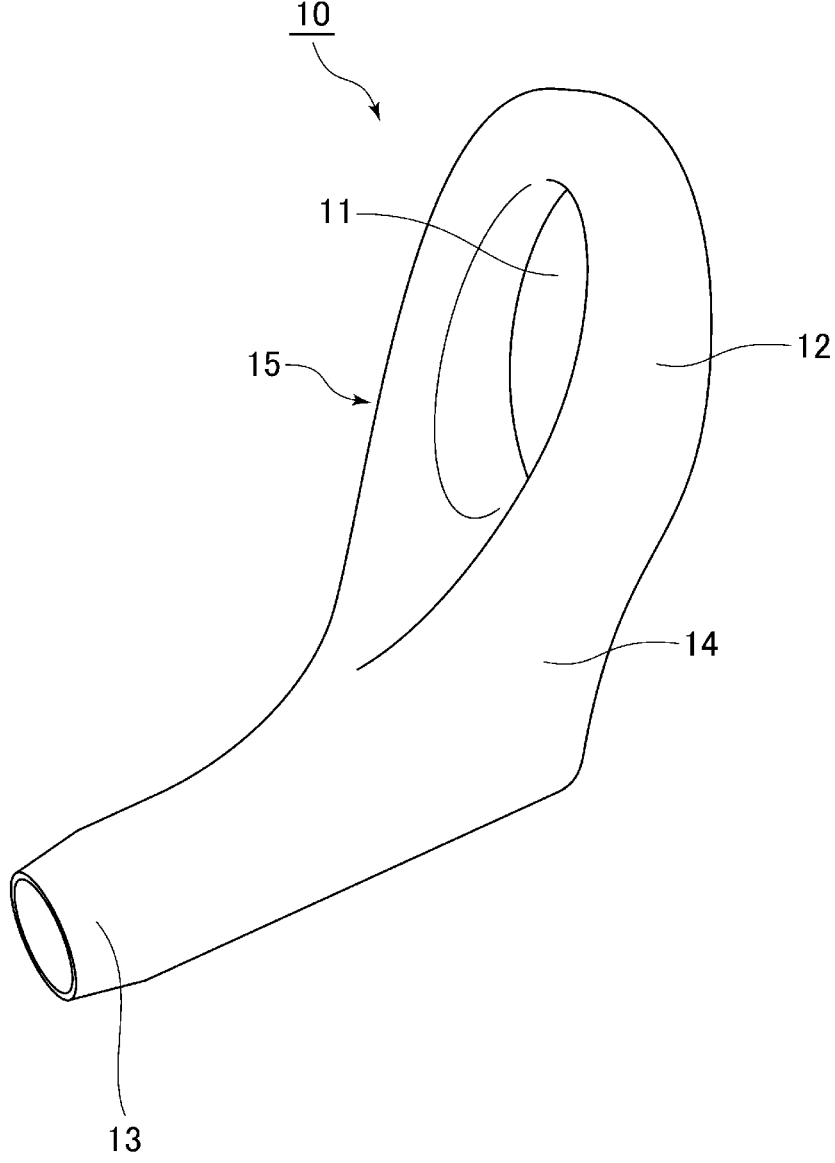
FIG. 2 is a view illustrating an entire fishing line guide 10 according to an embodiment of the present disclosure.

Next, the fishing line guide (top guide) 10 according to an embodiment of the present disclosure will be further described with reference to FIGS. 2, 3, 4, 5, and 6. As illustrated in FIG. 2, the fishing line guide 10 according to an embodiment of the present disclosure comprises a fishing line guiding portion 12 formed with a through-hole 11 for guiding a fishing line, a fishing rod fixing portion 13 to be fixed to the rod body 2 of the fishing rod 1, and a connection portion 14 connecting the fishing line guiding portion 12 and the fishing rod fixing portion 13, and the fishing line guide 10 is integrally formed of a ceramic material. Here, in the illustrated example, the top guide 10D is described as an example for convenience of description, but the present disclosure is also applicable to the other fishing line guides 10 (the same applies hereinafter). The ceramic material desirably has fracture toughness of 5 MPa·m$^{1/2}$ or more, but is not necessarily limited thereto.

With the fishing line guide 10 according to an embodiment of the present disclosure, it is possible to provide a fishing line guide capable of not only reducing the weight while securing the rigidity and strength of the entire guide but also reducing the occurrence of line twisting and line tangling during actual fishing. More specifically, eliminating the need for providing a separate guide ring for guiding a fishing line in the fishing line guide can reduce the weight. In addition, forming the fishing line guide from a ceramic material can greatly reduce frictional resistance caused by the contact of the fishing line with a metal frame or the like at the time of releasing the fishing line, so that it is possible to effectively suppress the occurrence of line twisting at the time of releasing the fishing line and the occurrence of line tangling at the time of actual fishing.

Figure 3:
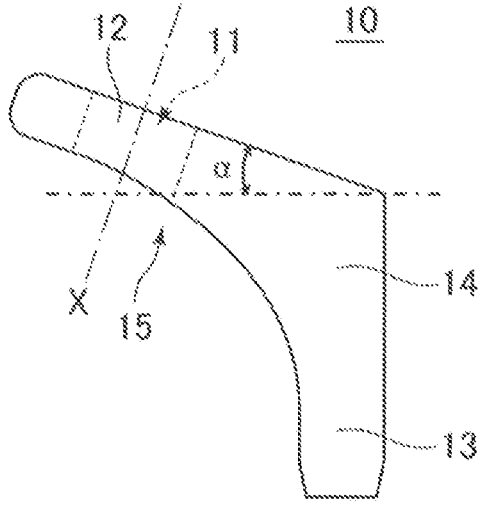
FIG. 3 is a view for explaining the fishing line guide 10 according to an embodiment of the present disclosure.

Next, as illustrated in FIG. 3, the fishing line guide 10 according to an embodiment of the present disclosure is formed in a concave shape as viewed from a direction perpendicular to the axis (X) of the through-hole 11 (from the perspective of FIG. 3), and an outer contour on an inner surface side 15 of the fishing line guiding portion 12 and the connection portion 14 is curved in an arc shape. It has been found that such a configuration can avoid concentration of stress induced in the fishing line guiding portion 12 and the connection portion 14 due to a large force generated by inadvertently hitting the fishing line guide or the like, and therefore strength and durability are greatly improved.

Further, as illustrated in FIG. 3, the fishing line guide 10 according to an embodiment of the present disclosure is formed in a concave shape as viewed from the direction perpendicular to the axis (X) of the through-hole 11, and the outer contour on the inner surface side 15 of the fishing line guiding portion 12 and the connection portion 14 has no straight portion. It has been found that such a configuration can avoid concentration of stress induced in the fishing line guiding portion 12 and the connection portion 14 due to a large force generated by inadvertently hitting the fishing line guide or the like, and therefore strength and durability are greatly improved.

Further, as illustrated in FIG. 3, in the fishing line guide 10 according to an embodiment of the present disclosure, the thickness of the fishing line guiding portion 12 increases toward the connection portion 14 as viewed along the direction of the axis (X) of the through-hole 11. As a result, line tangling is reduced and the strength is also improved.

Further, as illustrated in FIG. 3, in the fishing line guide 10 according to an embodiment of the present disclosure, the thickness of the connection portion 14 increases toward the fishing rod fixing portion 13 as viewed along the direction of the axis of the through-hole 11. As a result, line tangling is reduced and the strength is also improved.

Figure 4:
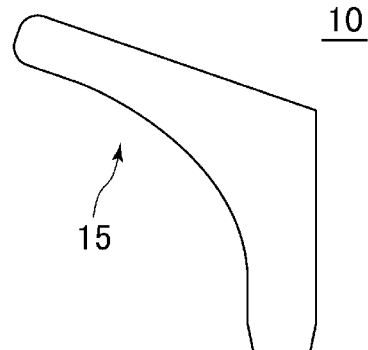
FIG. 4 is a view illustrating an aspect of the fishing line guide 10 according to an embodiment of the present disclosure.

Next, in the example illustrated in FIG. 4, the fishing line guide 10 according to an embodiment of the present disclosure is formed in a concave shape as viewed from the direction perpendicular to the axis (X) of the through-hole 11 (from the perspective of FIG. 4), the outer contour on the inner surface side 15 of the fishing line guiding portion 12 and the connection portion 14 is curved in an arc shape, and the fishing rod fixing portion 13 is formed in a straight shape or an approximately straight shape. It has been found that such a shape can effectively avoid concentration of stress particularly induced in the fishing line guiding portion 12 and the connection portion 14 due to a large force generated by inadvertently hitting the fishing line guide or the like, and therefore strength and durability are greatly improved.

Figure 5:
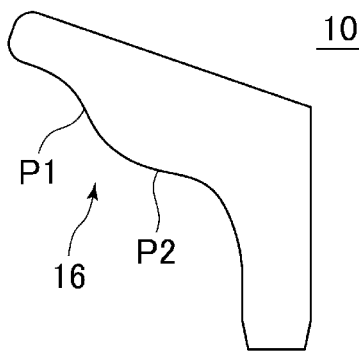
FIG. 5 is a view illustrating an aspect of the fishing line guide 10 according to an embodiment of the present disclosure.

Next, in the example illustrated in FIG. 5, the fishing line guide 10 according to an embodiment of the present disclosure is formed in a concave shape as viewed from the direction perpendicular to the axis (X) of the through-hole 11 (from the perspective of FIG. 5), the outer contour on the inner surface side 15 of the fishing line guiding portion 12 and the connection portion 14 comprises a plurality of arc portions 16 (in the illustrated example, three arc portions 16), and the arc portions 16 are connected by one or more inflection points P (in the illustrated example, two inflection points P1 and P2). It has been found that such h a shape can avoid concentration of stress particularly induced in the fishing line guiding portion 12 and the connection portion 14 due to a large force generated by inadvertently hitting the fishing line guide or the like, and therefore strength and durability are greatly improved. Here, each arc portion 16 may have either a concave shape or a convex shape as viewed from the inner surface side 15, and is not limited to a specific mode.

Figure 6:
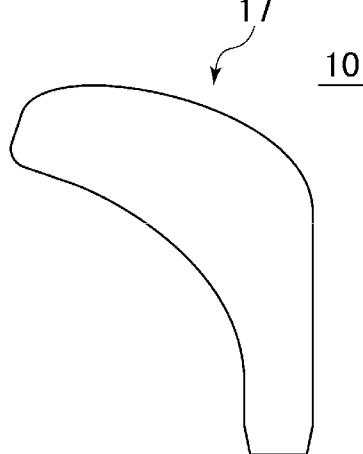
FIG. 6 is a view illustrating an aspect of the fishing line guide 10 according to an embodiment of the present disclosure.

Next, in the example illustrated in FIG. 6, in the fishing line guide 10 according to an embodiment of the present disclosure, an outer contour on an outer surface side 17 of the fishing line guiding portion 12 is curved in a convex shape (in the illustrated example, the outer contour on the outer surface side 17 of a combination of the fishing line guiding portion 12 and a part of the fishing rod fixing portion 13 is formed to be curved in a convex shape) as viewed from the direction perpendicular to the axis (X) of the through-hole 11 (from the perspective of FIG. 6). As a result, the strength of the fishing line guiding portion 12 can be improved.

Next, reference is made to FIG. 3 again. In the fishing line guide 10 according to an embodiment of the present disclosure, the fishing line guiding portion 12 is inclined by 10 to 45° with respect to the fishing rod fixing portion 13, that is, the angle α is in the range of 10 to 45°. As a result, line tangling is less likely to occur.

Next, dimensions of the fishing line guiding portion 12 and the through-hole 11 of the fishing line guide 10 according to an embodiment of the present disclosure will be described with reference to FIG. 7. The following tables show an outer diameter for each inner diameter (diameter of the through-hole 11) of the fishing line guiding portion 12, and the difference between the outer diameter and the inner diameter.

Figure 7:
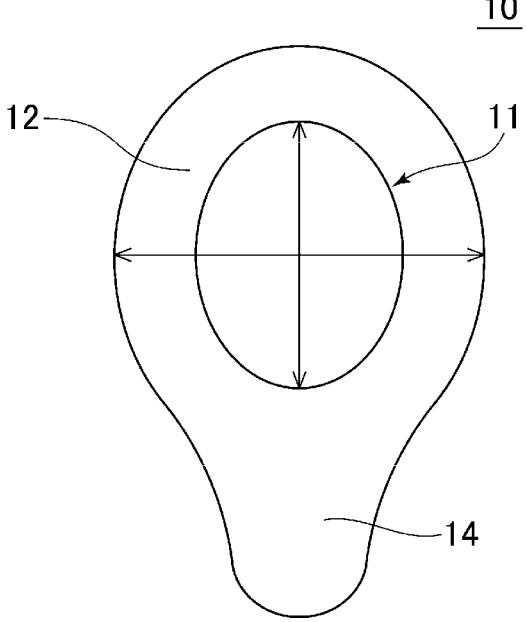
FIG. 7 is a view for explaining an outer diameter and an inner diameter of a fishing line guiding portion of the fishing line guide 10 according to an embodiment of the present disclosure.

Here, the shape of the fishing line guiding portion 12 and the through-hole 11 may be not only circular or substantially circular but also elliptical or substantially elliptical as illustrated in FIG. 7. In the case where the shape of the fishing line guiding portion 12 and the through-hole 11 is elliptical or substantially elliptical, the outer diameter of the fishing line guiding portion 12 refers to the outer diameter of the minor axis illustrated in FIG. 7, and the inner diameter (diameter of the through-hole 11) of the fishing line guiding portion 12 refers to the inner diameter of the major axis illustrated in FIG. 7.

First, Table 1 shows the outer diameter of the fishing line guiding portion 12 of the fishing line guide 10 according to an embodiment of the present disclosure when the inner diameter (diameter of the through-hole 11) of the fishing line guiding portion 12 is 2.2 mm, and the difference between the outer diameter and the inner diameter.

TABLE 1

| Unit mm | Conventional fishing line guide A (circle) | Conventional fishing line guide B (circle) | Fishing line guide according to embodiment of present disclosure |
|---|---|---|---|
| Outer diameter (minor axis) | 4.6 | 4.35 | 3.6 |
| Outer diameter – inner diameter | 2.4 | 2.2 | 1.4 |

As shown in the above table, the outer diameter of the fishing line guiding portion 12 of the fishing line guide 10 according to an embodiment of the present disclosure is 3.6 mm, which is smaller than those of conventional fishing line guides 10 of which fishing line guiding portions 12 have the same inner diameter (diameter of the through-hole 11). In addition, the difference between the outer diameter and the inner diameter is 1.4 mm, which is the thinnest as compared with the conventional fishing line guides 10. As described above, according to the fishing line guide 10 according to an embodiment of the present disclosure, the size of the fishing line guide can be made small and compact while keeping the inner diameter (diameter of the through-hole 11) of the fishing line guiding portion 12 the same as that of a conventional fishing line guide, and it has been found that the smaller outer diameter of the fishing line guiding portion 12 can reduce the occurrence of line tangling and line twisting. It has been also found that reducing the outer diameter of the fishing line guiding portion 12 does not pose a problem in terms of the strength of the fishing line guide.

Next, Table 2 shows the outer diameter of the fishing line guiding portion 12 of the fishing line guide 10 according to an embodiment of the present disclosure when the inner diameter (diameter of the through-hole 11) of the fishing line guiding portion 12 is 2.5 mm (major axis is 2.6 mm), and the difference between the outer diameter and the inner diameter in the case where the through-hole is circular and in the case where the through-hole is elliptical.

TABLE 2

| Unit mm | Conventional fishing line guide A (circle) | Conventional fishing line guide B (circle) | Fishing line guide according to embodiment of present disclosure (circle) | Fishing line guide according to embodiment of present disclosure (ellipse) |
|---|---|---|---|---|
| Outer diameter (minor axis) | 4.8 | 4.8 | 4.5 | 3.7 |
| Outer diameter – inner diameter | 2.3 | 2.3 | 2.0 | 1.2 |

As shown in the above table, the outer diameter of the fishing line guiding portion 12 of the fishing line guide 10 according to an embodiment of the present disclosure is 4.5 and 3.7 mm, respectively, which is smaller than those of conventional fishing line guides 10 of which fishing line guiding portions 12 have the same inner diameter (diameter of the through-hole 11). In addition, the difference between the outer diameter and the inner diameter is 2.0 and 1.2 mm, which is the thinnest as compared with the conventional fishing line guides 10. As described above, according to the fishing line guide 10 according to an embodiment of the present disclosure, the size of the fishing line guide can be made small and compact while keeping the inner diameter (diameter of the through-hole 11) of the fishing line guiding portion 12 the same as that of a conventional fishing line guide, and it has been found that the smaller outer diameter of the fishing line guiding portion 12 can reduce the occurrence of line tangling and line twisting. It has been also found that reducing the outer diameter of the fishing line guiding portion 12 does not pose a problem in terms of the strength of the fishing line guide.

Next, Table 3 shows the outer diameter of the fishing line guiding portion 12 of the fishing line guide 10 according to an embodiment of the present disclosure when the inner diameter (diameter of the through-hole 11) of the fishing line guiding portion 12 is 4.1 mm, and the difference between the outer diameter and the inner diameter.

TABLE 3

| Unit mm | Conventional fishing line guide A (circle) | Conventional fishing line guide B (circle) | Fishing line guide according to embodiment of present disclosure (ellipse) |
|---|---|---|---|
| Outer diameter (minor axis) | 7.3 | 6.5 | 6.0 |
| Outer diameter – inner diameter | 3.2 | 2.4 | 1.9 |

As shown in the above table, the outer diameter of the fishing line guiding portion 12 of the fishing line guide 10 according to an embodiment of the present disclosure is 6.0 mm, which is smaller than those of conventional fishing line guides 10 of which fishing line guiding portions 12 have the same inner diameter (diameter of the through-hole 11). In addition, the difference between the outer diameter and the inner diameter is 1.9 mm, which is the thinnest as compared with the conventional fishing line guides 10. As described above, according to the fishing line guide 10 according to an embodiment of the present disclosure, the size of the fishing line guide can be made small and compact while keeping the inner diameter (diameter of the through-hole 11) of the fishing line guiding portion 12 the same as that of a conventional fishing line guide, and it has been found that the smaller outer diameter of the fishing line guiding portion 12 can reduce the occurrence of line tangling and line twisting. It has been also found that reducing the outer diameter of the fishing line guiding portion 12 does not pose a problem in terms of the strength of the fishing line guide.

In the fishing line guide 10 according to an embodiment of the present disclosure, the difference between the outer diameter and the inner diameter of the fishing line guiding portion 12 is in the range of 1.2 mm to 2.0 mm. Thus, line tangling can be reduced and the weight can be further reduced.

In the fishing line guide 10 according to an embodiment of the present disclosure, a ratio of the inner diameter of the fishing line guiding portion 12 to the outer diameter of the fishing line guiding portion 12 is 0.55 or more. Thus, line tangling can be reduced and the weight can be further reduced.

A fishing rod according to an embodiment of the present disclosure comprises: a rod tube; and a fishing line guide comprising a fishing line guiding portion formed with a through-hole for guiding a fishing line, a fishing rod fixing portion to be fixed to the rod tube, and a connection portion connecting the fishing line guiding portion and the fishing rod fixing portion, and the fishing line guide is integrally formed of a ceramic material.

With the fishing rod according to an embodiment of the present disclosure, it is possible to provide a fishing rod comprising a fishing line guide capable of not only reducing the weight while securing the rigidity and strength of the entire guide but also reducing the occurrence of line twisting and line tangling during actual fishing. More specifically, eliminating the need for providing a separate guide ring for guiding a fishing line in the fishing line guide can reduced the weight. In addition, forming the fishing line guide from a ceramic material can greatly reduce frictional resistance caused by the contact of the fishing line with a metal frame or the like at the time of releasing the fishing line, so that it is possible to effectively suppress the occurrence of line twisting and line tangling at the time of actual fishing.

The fishing rod according to an embodiment of the present disclosure can comprise the rod tube and the fishing line guide 10 according to any one of the embodiments of the present disclosure described above.

Finally, a method for molding the fishing line guide 10 according to an embodiment of the present disclosure will be described. First, a ceramic material is prepared, and a fishing line guide prototype having a desired size and shape is molded by injection molding and is subjected to a sintering treatment. Then, a barrel treatment is performed on the processed fishing line guide prototype, and the fishing line guide 10 according to an embodiment of the present disclosure is thus molded. Further details of the molding method are omitted.

The dimensions, materials, and arrangement of the components described herein are not limited to those explicitly described in the embodiments, and the components can be modified to have any dimensions, materials, and arrangement that may fall within the scope of the present disclosure. Further, components not explicitly described herein can be added to an embodiment described above, or some of the components described in the embodiments can be omitted.

REFERENCE SIGNS LIST

1 Fishing rod
2 Rod body
3 Base rod
5 Middle rod
6 Reel
7 Tip rod
8 Reel seat
10 Fishing line guide
11 Through-hole
12 Fishing line guiding portion
13 Fishing rod fixing portion
14 Connection portion
15 Inner surface side
16 Arcuate portion
17 Outer surface side
X Axis of through-hole
P1 Inflection point
P2 Inflection point

The invention claimed is:

1. A fishing line guide comprising:
a fishing line guiding portion formed with a through-hole for guiding a fishing line;
a fishing rod fixing portion to be fixed to a fishing rod; and
a connection portion connecting the fishing line guiding portion and the fishing rod fixing portion, wherein
the fishing line guide is integrally formed of a ceramic material,
a first outer contour on a first side of the fishing line guide is formed in a concave shape as viewed from a direction perpendicular to a central axis of the through-hole, the concave shape extending along the first outer contour continuously from the connection portion to a first position on a first opening edge of the through-hole, the first opening edge being located at a narrowest portion of the through-hole, and the first position being closest to the fishing rod fixing portion among positions on the first opening edge, and
the first outer contour on the first side of the fishing line guide has no straight portion, and a second outer contour on the first side of the fishing line guide is linear without curves.

2. The fishing line guide according to claim 1, wherein a thickness of the fishing line guiding portion increases toward the connection portion as viewed along the direction of the central axis of the through-hole.

3. The fishing line guide according to claim 1, wherein a thickness of the connection portion increases toward the fishing rod fixing portion as viewed along the direction of the central axis of the through-hole.

4. The fishing line guide according to claim 1, wherein the first outer contour comprises a plurality of arc portions, and the arc portions are connected by one or more inflection points.

5. The fishing line guide according to claim 1, wherein the fishing line guiding portion is inclined by 10 to 45° with respect to the fishing rod fixing portion.

6. The fishing line guide according to claim 1, wherein a second outer contour on a second side of the fishing line guiding portion is curved in a convex shape as viewed from the direction perpendicular to an axis of the through-hole.

7. The fishing line guide according to claim 1, wherein a difference between an outer diameter and an inner diameter of the fishing line guiding portion is in a range of 1.2 mm to 2.0 mm.

8. The fishing line guide according to claim 1, wherein a ratio of an inner diameter of the fishing line guiding portion to an outer diameter of the fishing line guiding portion is 0.55 or more.

9. A fishing rod comprising:
a rod tube; and
a fishing line guide comprising a fishing line guiding portion formed with a through-hole for guiding a fishing line, a fishing rod fixing portion to be fixed to the rod tube, and a connection portion connecting the fishing line guiding portion and the fishing rod fixing portion, wherein
the fishing line guide is integrally formed of a ceramic material, and
a first outer contour on a first side of the fishing line guide is formed in a concave shape as viewed from a direction perpendicular to a central axis of the through-hole, the concave shape extending along the first outer contour continuously from the connection portion to a first position on a first opening edge of the through-hole, the first opening edge being located at a narrowest portion of the through-hole, and the first position being closest to the fishing rod fixing portion among positions on the first opening edge, wherein the first outer contour on the first side of the fishing line guide has no straight portion, and a second outer contour on the first side of the fishing line guide is linear without curves.

* * * * *